(12) United States Patent
Munson et al.

(10) Patent No.: US 6,233,675 B1
(45) Date of Patent: May 15, 2001

(54) FACILITY TO ALLOW FAST EXECUTION OF AND, OR, AND TEST INSTRUCTIONS

(75) Inventors: Kenneth K. Munson, Saratoga; Peter C. Mills, San Jose, both of CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/276,315

(22) Filed: Mar. 25, 1999

(51) Int. Cl.[7] .................................................. G06F 9/305

(52) U.S. Cl. ........................................... 712/227; 712/226

(58) Field of Search ..................................... 712/227, 226

(56) References Cited

U.S. PATENT DOCUMENTS

| | | | | |
|---|---|---|---|---|
| 4,415,969 | * | 11/1983 | Bayliss | 712/227 |
| 5,479,652 | * | 12/1995 | Dreyer | 714/32 |
| 5,572,666 | * | 11/1996 | Whitman | 714/32 |
| 6,009,512 | * | 12/1999 | Christie | 712/226 |

OTHER PUBLICATIONS

Intel, *Intel Architecture Software Developer's Manual*, "Instruction Set Reference," vol. 2 Order No. 243191, (1997) pp. 1–1 through to Index–7.

* cited by examiner

Primary Examiner—Eric Coleman
(74) Attorney, Agent, or Firm—Oblon, Spivak, McClelland, Maier & Neustadt, P.C.

(57) ABSTRACT

Improvements are made in how microprocessors execute AND, OR, and TEST instructions when the operands of this instruction are equal. AND/OR/TEST instructions with equal operands are used to set flags based on the contents of the single operand without explicitly performing the actual AND/OR/TEST command. By resetting these flags directly, this mechanism allows these instructions to be paired with preceding dependent instructions simply by using the flags set by the AND/OR/TEST for the previous instruction. An architecture that hardwires the implementation into the microprocessor through logic gates is preferred. This will result in increased speed while reducing power consumption. Further, a full-sized ALU is not needed in order to execute the AND/OR/TEST instruction with equal operands. As this is a more direct procedure, a pipeline with a reduced capability ALU can be utilized.

32 Claims, 3 Drawing Sheets

FACILITY TO ALLOW FAST EXECUTION OF AND, OR, AND TEST INSTRUCTIONS

BACKGROUND OF THE INVENTION

This invention relates generally to microprocessors and their architecture for executing instructions and, more specifically, to the implementation of AND, OR, TEST commands with equal operands.

Due to its familiarity, the discussion below will use the Intel™ X86 architecture when it is necessary to be specific. The book by Intel, *Intel Architecture Software Developer's Manual, Volume 2*, 1997, gives more details and is hereby incorporated herein by this reference.

As it is usually implemented, a microprocessor contains as part of its architecture a number of registers. These commonly contain a set of general purpose registers to hold data or address quantities, called AX, BX, and so on. An additional set of standard registers is known as the flags register. A collection of commands, the instruction set, controls the operation of the microprocessor.

The flags register consists of a number of small, usually one bit, subregisters, or flags, that control a number of conditional instructions and indicate the status of the processor. The microprocessor frequently needs to assign values to these flags for conditional transfers, such as jump instructions dependent upon the value of a certain flag. An example is the zero flag (ZF) that is set if the outcome of a particular instruction is zero. This flag is then consulted by subsequent operations if it should become important to determine if a particular operand is zero.

Some of the basic members of the instruction set are the logical command OR, the logical command AND, and the related TEST command. An OR command with, say, two registers as operands compares the contents of the two registers and forms the logical OR of the two on a bit by bit basis. It then writes the result back, in this example to the first register:
or ax,bx; AX←[AX] OR [BX].
(The notation here is that the contents of a register are indicated by placing the register s label in brackets, for example [AX] are the contents of AX. ) Finally, the appropriate flags are given values according to the outcome of the command. Similarly, an AND command, again using the example where the operands are two registers,
and ax,bx; AX←[AX] AND [BX],
will AND the contents of the two registers on a bit by bit basis, write the result back, and then assign the flags accordingly. A TEST command is the same as an AND command, except it does not write the result back.

The use of the AND, OR, and TEST commands with equal operands is a convenient method for adjusting the values in the flags register. To understand why this is useful, consider the following segment of code where MEM is some memory address and ADDR some target instruction:

| | |
|---|---|
| sub cx,bx | ; CX ← [CX] − [BX] |
| mov ax,mem | ; moves [MEM] into AX |
| jz addr | ; jumps to ADDR if zero flag is set, ZF=1. |

The problem with this set of instructions is that neither the move command nor the jump command affect the flags. This jump instruction, JZ, will be carried out based on the status of the zero flag as previously set by the subtraction. If the programmer intends for this jump to be based on the values in the register AX as it stands after the move command has been executed, the flags need to be set or reset appropriately. A way to do this is to use the AND, OR, or TEST command with AX as both of its arguments.

By ANDing the register AX with itself, the contents of AX, [AX], will be compared bit by bit to themselves, written back into AX, and the flags set according to the outcome of the operation. But the result of forming the logical AND of a bit with itself is just to give the same value back for that bit, regardless of whether it is 0 or 1. Thus the result of
and ax,ax; AX←[AX] AND [AX]
will be to leave the value of AX unchanged. The flags register will now be set to reflect the result of the command, but as this was just [AX], the flags now indicate the contents of this register. As the result of the logical OR of something with itself is also just the thing back, and as a TEST instruction is just an AND without the writeback, these two instructions will act in exactly the same way as the AND instruction when their operands are equal.

Going back to the fragment of code above, if the programmer intended for the jump to depend on the contents of AX, it should be written as

| | |
|---|---|
| sub cx,bx | ; CX ← [CX] − [BX] |
| mov ax,mem | ; moves [MEM] into AX |
| and ax,ax | ; AX ← [AX] AND [AX] |
| jz addr | ; jumps to ADDR if zero flag is set, ZF=1. |

Inserting the AND line will leave the value of AX unchanged, but the flags will now reflect AX, not some previous operation. The jump JZ will now depend on whether [AX]=0. Note that either an OR or a TEST instruction could be used instead of the AND, their result being the same when all the operands are equal.

While this shows the utility of the AND/OR/TEST with equal operands, it also gives some indication of the redundancies inherent in its execution. To execute this command, the microprocessor must execute a number of actions. First it must get the contents of the operand, compare these with themselves on a bit by bit basis, and then (except for TEST) write the result back. The result of these steps is that the operand's contents are unchanged. More to the point, it must also note the outcome of the command and adjust a number of flags accordingly. Thus to perform this command and its attendant executions will require several steps, largely redundant, and therefore may use several clock cycles.

The consequences of this are particularly acute in a multiple pipeline microprocessor. Here, several commands are issued in parallel. This often results in some instructions having to wait as they may be dependent upon the outcome of another instruction. Going back to the example, consider again

| | |
|---|---|
| mov ax,mem | ; moves [MEM] into AX |
| and ax,ax | ; AX ← [AX] AND [AX] |
| jz addr | ; jumps to ADDR if zero flag is set, ZF=1, | where the jump instruction JZ depends on the outcome of the AND—which itself depends on the MOV instruction—and must wait for it to finish in that instruction's pipeline. Hence, when one instruction is paired with preceding dependent instructions, several pipelines may be stalled for one or more clock cycles.

Since the result of the AND/OR/TEST command with equal operands is known in advance to just be the original operand, regardless of the actual contents, this instruction results in the redundancies listed above. As this instruction is a useful technique, the resultant consumption of time and power can become significant.

It is the primary object of the present invention to reduce these limitations by decreasing the amount of redundancy in executing AND/OR/TEST instructions with equal operands.

It is another object to increase speed and reduce power consumption within a microprocessor.

SUMMARY OF THE PRESENT INVENTION

These and additional objects are accomplished by the various aspects of the present invention, wherein, briefly and generally, according to one such aspect, AND/OR/TEST instructions with equal operands are used to set/reset flags without explicitly performing the actual AND/OR/TEST command. By setting or resetting these flags directly, based only on the contents of this single operand, this mechanism allows these instructions to be paired with preceding dependent instructions simply by using the flags set by the previous instructions.

An architecture that hardwires the implementation into the microprocessor through logic gates is preferred. This will result in increased speed while reducing power consumption.

According to another further aspect, a full-sized arithmetic logic unit (ALU) is not needed in order to execute the AND/OR/TEST instruction with equal operands. As this is a more direct procedure, a pipeline with a reduced capability ALU can be utilized.

DETAILED DESCRIPTION OF THE PREFERRED EMBODIMENT

Figure 1:
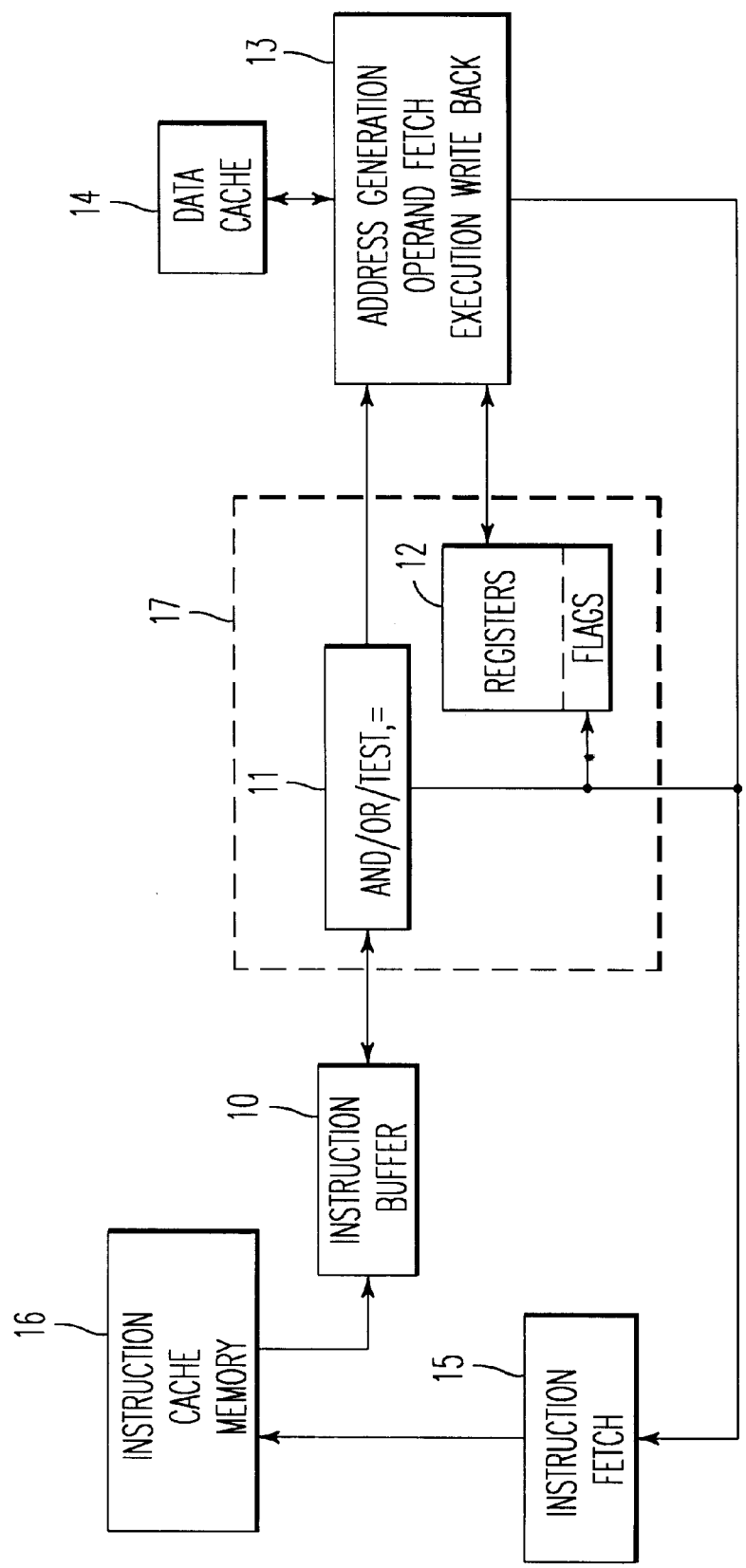
FIG. 1 is a block diagram representation of a microprocessor utilizing various aspects of the present invention.

For background, first consider an AND command which accepts two registers for operands and how it is executed in the prior art. This discussion also applies for the OR and TEST command, but to keep the exposition manageable it will often refer to just the AND. A microprocessor will contain a number of general registers generically labeled AX, BX, and so on. The contents of a register are indicated by placing the register's name in brackets, for example [AX] is the contents of AX. When the processor receives an AND instruction,
and ax,bx; AX←[AX] AND [BX],
it compares the contents of register AX bit by bit with those of register BX, with the result then written back to register AX.

The processor must then determine which flags to set or reset as a consequence of the outcome of this instruction. Among the flags of interest here are:

ZF zero flag, set to 1 if all the bits of a result are zero, otherwise ZF=0;

SF sign flag, set to 1 if the result is negative, otherwise SF=0;

OF overflow flag, set to 1 if the result resulted in a signed overflow, otherwise OF=0;

PF parity flag, set to 1 if result contains an even number of 1s, otherwise PF=0;

CF carry flag, set to 1 if the result has generated a carry, otherwise CF=0.

These flags are then all determined and assigned appropriately based on the result of the AND instruction. The book by Intel, *Intel Architecture Software Developer's Manual, Volume 2*, 1997 gives more details both on the flags and the commands discussed below.

A common programming technique for setting or resetting these flags based on a particular register, say AX, is to issue the command
and ax, ax,
sometimes referred to as (AND,=) below. Since the contents of AX are clearly equal to themselves, and both 0 and 1 stay 0 and 1 when ANDed (or ORed) with themselves, this results in all the bits in AX being written back to the same value. As a consequence, the flags listed above are also set or reset, ZF, PF, and SF according to the value of [AX], while OF, CF=0. But consider how this is done: the contents of AX, [AX], must be accessed and moved to the arithmetic logic unit (ALU), compared bit by bit with themselves, determined equal, resulting in each bit being written back to the value it already contains . This must then be examined to determine which flags need to be altered, upon which the appropriate changes are made to the flags register. As this is a common command, this highly redundant series of steps will be executed many times.

In contrast, the first aspect of the present invention avoids this redundancy. When an AND/OR/TEST command is received, and if its register operands are equal, the contents of that register are left as they are while the appropriate flags are directly given values based on the contents of the register. Since the outcome of this operation is already in the register to start with, this saves the steps of accessing, moving to the ALU, and comparing bit by bit the contents of the register, evaluating the result, and finally writing this result back to the register, thereby avoiding the execution steps of the prior art. When in the preferred embodiment of a multiple pipeline microprocessor, the (AND/OR/TEST,=) command can then be placed in a pipeline without the full capabilities normally required.

To appreciate the utility of the (AND/OR/TEST,=) command, it needs to be considered in terms of its relation to preceding dependent instructions.

Two of the fundamental types of commands are the move commands, MOV, and the conditional jump commands, Jcc. The move commands are used to move the contents of the computer from one location to another, say from a memory location MEM into register AX. The conditional jump commands will send the processor to a particular instruction ADDR when specified conditions are met: JZ, jump if zero (ZF=1); JNO, jump if no overflow (OF=0); JS, jump if sign (SF=1); and so on. In general, the condition on which the jump depends is determined by the value of a flag or set of flags. What neither of these classes instructions, as normally implemented, does is affect the flags.

Thus, the instruction
mov ax,mem; moves [MEM] into AX
will move the contents of the memory address MEM into the register AX, but the flags are unchanged and still reflect whatever values they had previously. If a conditional jump command is then issued, say JS, the jump is then made if the result of some previous operation was negative, but not on whether the value of AX as imported from MEM is negative.

To have this jump predicated upon [AX] being negative requires the flags to be adjusted to reflect [AX]. So by issuing the pair of instructions

| | |
|---|---|
| mov ax,mem | ; moves [MEM] into Ax |
| and ax,ax | ; AX ← [AX] AND [AX], | the contents of the MEM are placed in AX and the flags register reflects these contents. Any conditional jump instructions will now be based on [AX].

This example of the move and conditional jump was used both since they are familiar and because it is relatively clear how they operate. But there are many other instruction which produce circumstances where the flags need to be set according the values of a certain register before a following instruction is performed. In any of these cases, the pairing of the (AND/OR/TEST,=) instruction with the preceding dependent instruction can accomplish this. The present invention improves the method used to preform the (AND/OR/TEST,=) in the way described above, and as given below in more detail.

FIG. 1 is a block diagram of a basic embodiment of the present invention. The (AND/OR/TEST,=) block 11 receives instructions as they are issued from an instruction buffer 10. If the instruction is one of AND/OR/TEST with the same register for both of its operands, the "+" path is taken. The result is immediately implemented in the registers 12, assigning the flags appropriately. It can then go back to the instruction fetch stage 15 and proceed with the next instruction. Otherwise, the "−" path is taken and the instruction is then passed on to the execution stage 13 where it is processed normally. Note that the (AND/OR/TEST,=) block 11 needs neither the various steps listed in the execution stage 13 nor access to the memory cache 14.

The dashed box 17 contains the elements of a preferred embodiment of the present invention. Although this has been presented in the context of a microprocessor as its preferred embodiment, it should be noted that the invention can be implemented in a much more basic environment. At a more minimal level, all that is required is a set of registers, including at minimum a flags register, and an instruction execution device of some form which accepts any of an AND, OR, or TEST as a member of its instruction set. The operands themselves need not themselves be registers. They could also be more than two since the logical operations of AND and OR are well defined for three or more arguments. Once an AND/OR/TEST instruction is received and found to have all its operands equal, it would directly set the selected set of flags to the predetermined values. In any of these more general situations, this improves the efficiency of a pair of dependent instructions such as

| | |
|---|---|
| mov ax,mem | ; moves [MEM] into Ax |
| and ax,ax | ; AX ← [Ax] AND [AX], | by directly assigning the flags along with doing the move. Since the outcome of the AND/OR/TEST is known beforehand, it produces this result without actually executing the AND/OR/TEST instruction.

Figure 2:
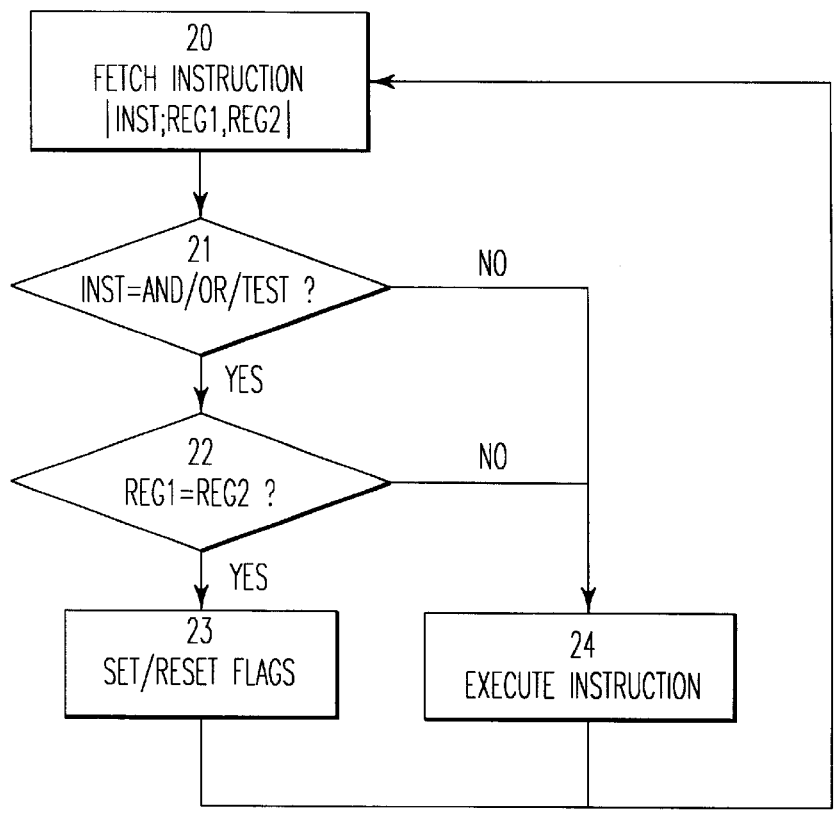
FIG. 2 is a flow chart illustrating a preferred operation of the present invention.

Returning to the preferred embodiment, FIG. 2 is a flow chart to illustrate the conceptual basis of the present invention with two registers for operands. Upon fetching an instruction in step 20, the processor will decide in step 21 whether the instruction is one of the AND, OR, or TEST instructions. If so, it is passed to step 22 where the operands are compared. (In practice, both of these decisions, steps 21 and 22, can be made at the same time.) When these operands are equal, step 23 follows in which the prescribed flags are set/reset according to the value of the operands. In the preferred embodiment, the overflow and carry flags can be set directly as they will always give the result CF, OF=0. Should either step 21 or step 22 produce a negative result, the processor instead passes the instruction on to the execution stage of step 24, where the instruction is carried out in the usual manner. When step 23 or 24 is complete, the next instruction is fetched and the process repeated.

It is the left hand column on FIG. 2, consisting of steps 21–23, which is the present invention: note the dedicated AND/OR/TEST path which completely bypasses the execution step 24 when the operands are equated. This isolation of these commands distinguishes the present invention from the prior art.

To be more specific on this operation, consider the example of an instruction with two registers as operands. This will be represented symbolically as |INST:reg1,reg2| below: INST is the particular instruction issued, such as an ADD or AND, and reg1 and reg2 are the operands of the instruction. In terms of operation code INST will be realized as a series of 0s and 1s. The (here 3 bit) binary label of each of the registers will be abc. Writing this symbolic representation above its realization in operation code produces the notation

|INST : reg1, reg2|
0s, 1S :$a_1b_1c_1b_2c_2$ .

For specificity, when a particular realization of operation code is needed, Intel™ X86 code is used. Appendix B of the book by Intel, *Intel Architecture Software Developer's Manual, Volume 2*, 1997 gives more detail.

The example of an AND command is then the two byte instruction

| AND :reg1,reg2|
001000rw;11$a_1b_1c_1a_2b_2c_2$ .

The r determines to which of the two registers the result is written, and is, therefore, irrelevant when they are equal. The w refers to the size of the register and may also take either value here. The two 1s after the semicolon, included to separate the command into bytes, indicate that the operands given to AND command will be two registers.

Steps 21 and 22 of FIG. 2 then consist of making the comparison:

INST=AND, reg1=reg2 ?
001000--;11abcabc ?, with the second line being what the positive result looks like as a piece of operation code, and with "−" indicating either value is acceptable in this example. Note again that only the label of the register, abc, is compared, not the contents, [abc].

(Some instruction sets, such as the Intel™ set referred to here, contain AND, OR, and TEST instructions where only one operand is specified, instead of the usual multi-operand structure. In these cases, a second operand, usually the accumulator, is actually implicit in the instruction code. For this reason, this case is also really a two operand instruction: since the second, implicit operand is inherent in the code, the present invention also covers this case of a single (explicit) operand. Similarly, it could also be extended to the more general situation of three or more operands mentioned above, with one or more of these operands now being implicit.)

If the instruction meets both of these conditions, the result would then be step 23, namely to ignore the actual logical execution involved in the AND/OR/TEST instruction, leaving the contents of the operand in their current state, and immediately set the flags according to the contents of this operand. In one embodiment, which is preferred, it would also be possible to make the assignment OF,CF→0 directly as the (AND/OR/TEST,=) instruction will produce neither an overflow nor a carry. This leaves only the three flags PF, SF, and ZF to evaluate.

It should be noted that a more general assignment of flags could be executed in the same manner: exactly which flags are adjusted and what value they are given can be chosen differently than above. These choices are the conventional outcome of an AND/OR/TEST command with equal operands. Other choices, where, say, the value of a particular flag is left unchanged or set differently, can easily be implemented in exactly the same way. However, as the programmer would need to keep these permutations in mind, this could cause programming confusion. So although a more general arrangement is easily conceivable, this more transparent assignment is the preferred embodiment.

Another aspect of the present invention is to perform the comparison using state machines or by microprogramming of the controller for the microprocessor. However, primary goal here is to both increase speed and decrease power consumption. Microprogramming might deprive the present invention of much of its advantage. For these reasons, the present invention is hardwired into the preferred embodiment.

Figure 3:
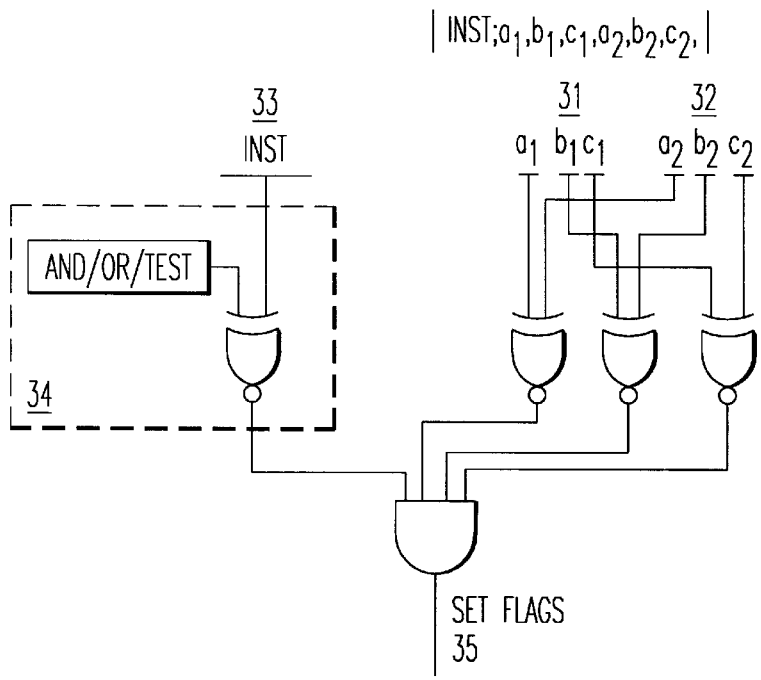
FIG. 3 is a simplified example of how a portion of the present invention may be implemented in terms of basic logic circuits.

FIG. 3 is one embodiment showing how the left column of the FIG. 2 flow chart, steps 21–22, may be hard wired into the microprocessor for the example given above with two registers as the operands. The input is the operation code containing the instruction INST, 33, and the binary labels of the pair of registers, 31 and 32. The registers are compared at the same time as the instruction is compared with that for AND, OR, and TEST instructions 34, which are fixed in the circuit. If there is a match in both cases, a control signal SETFLAGS 35 results and the flags will be set according to the values of the operand. This is a straightforward way to achieve the necessary results for that part of the circuit which would be added to directly perform the flag assignments required. Note that the actual contents of the register are not consulted when making the comparison.

Figure 4:
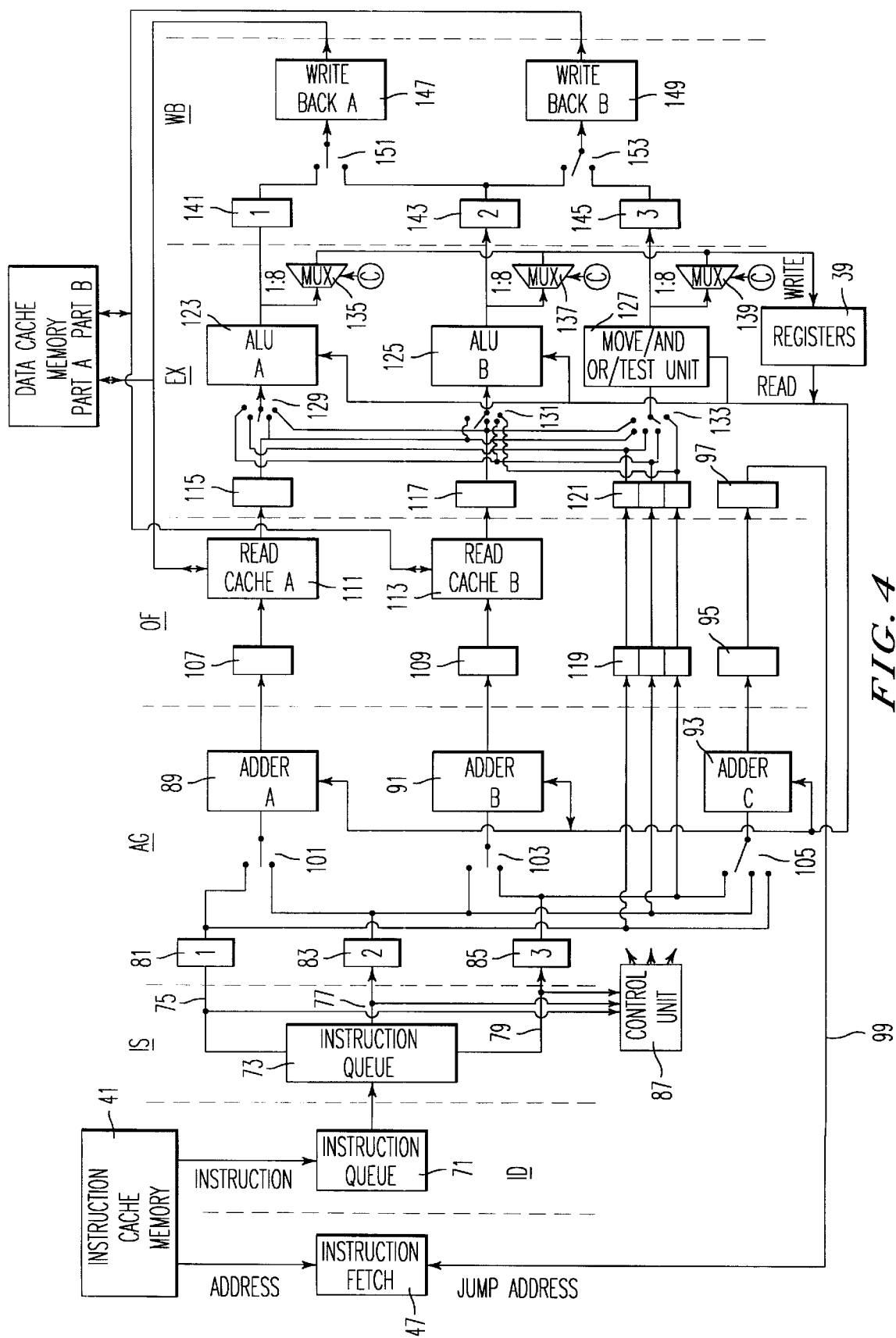
FIG. 4 is an incorporation of the present invention within a microprocessor multiple pipeline architecture.

FIG. 4 shows another aspect of the present invention by placing it within the context of a microprocessor. In this particular embodiment it is shown in a multiple pipeline architecture, specifically in a three pipeline example where one of the pipelines has a reduced ALU. First a description of FIG. 4 is given, followed by an explanation of how the invention is incorporated within this architecture. For a more detailed discussion of the operation of FIG. 4, see copending United States patent application "Dynamic Allocation of Resources in Multiple Microprocessor Pipelines", Munson, Ser. No. 09/062,804, filed Apr. 20, 1998, that is hereby incorporated herein by this reference. FIG. 4 of the current application is a modified version of FIG. 2 found there.

In the preferred embodiment as shown in FIG. 4, a standard pipeline consists of the stages Instruction Decode (ID), instruction ISsue (IS), Address Generation (AG), Operand Fetch (OF), EXecution (EX), and finally Write Back (WB). These stages are traversed by three separate pipelines which pass through either ALU A 123, ALU B 125, or the move/AND/OR/TEST unit 127. When an instruction arrives from the instruction queue 71, the instruction issue unit 73 sends it to one of the three latches 81, 83, or 85. The instruction issue unit 73 and control unit 87 determine which latch it is sent to and, by way of the two sets of switches (101, 103, 105) and (115, 117, 121), which pipeline it takes. This depends upon what the instruction is, and whether it requires a full ALU. Finally, after passing through either a full ALU or the move/AND/OR/TEST unit, the results are written back to the registers 39 or data cache 43 as needed. Although in this preferred embodiment the invention is implemented for all three of the AND, OR, and TEST instructions, alternate embodiments could implement a sub-group of these three.

When the instruction issue unit 73 receives an (AND/OR/TEST,=) signal, it is directed down the third pipeline, passing through latches 119 and 121 and into the move/AND/OR/TEST unit 127. In this embodiment, the present invention resides in the move/AND/OR/TEST unit 127, where a circuit such as that in FIG. 3 executes the (AND/OR/TEST,=), in conjunction with the instruction issue stage, that must recognize the command as such a signal. This serves several purposes: it leaves the full ALUs 123 and 125 free for instructions which may require them, reduces power consumption by both using a less than full sized ALU and avoiding the adders and cache readers, and increases speed for the execution of the (AND/OR/TEST,=) commands. Other simplified instructions, such as the method for executing exclusive OR instruction described in the copending United States patent application "Facility to Allow Fast Execution of XOR Instructions" by Munson and Mills, Ser. No. 09/227,787, filed Jan. 8, 1999, which is hereby incorporated by reference herein, could also be combined into the unit 127, but it would still have significantly less capability than the full ALUs 123 and 125.

This embodiment also allows an (AND/OR/TEST,=) instruction to be paired with preceding dependent instructions more efficiently. Consider again the code fragment

| sub cx,bx | ; CX ← [CX] − [BX] |
| mov ax,mem | ; moves [MEM] into AX |
| and ax,ax | ; AX ← [AX] AND [AX] |
| js addr | ; jumps to ADDR if sign flag is set, SF=1. |

The flags are set by the subtraction; in particular, SF is determined by whether [BX]≧[CX]. The move instruction then loads the contents of MEM into AX, but leaves the flags unchanged. If the programmer wants the conditional jump JS to depend on whether [AX] is positive, and not on the subtraction, the (AND,=) instruction is invoked. There is still the need to evaluate AX for setting the flags, but the logic functions of a full ALU are no longer required since the actual logical functions themselves are no longer carried out.

By simply setting the flags directly from the content of AX in this manner, a pair such as mov ax,mem
and ax,ax may be issued simultaneously, with the (AND,=) paired with this preceding dependent instruction. The (AND/OR/TEST,=) could proceed down the third pipeline incorporating the invention, while the preceding dependent instruction may simultaneously move down another pipeline. This allows these two instructions to be paired even though the AND instruction is dependent on the MOV instruction. A following flag dependent instruction, such as the conditional jumps, can also proceed without getting stalled while it waits for the logic functions of the ALU the prior art would employ for the (AND/OR/TEST,=) to be completed.

The utility of the present invention is increased by this inclusion of the AND/OR/TEST command in a reduced capacity ALU, or in the extreme case no ALU, pipeline. For the preferred embodiment it is combined into the dedicated move/AND/OR/TEST unit 127 that can access the non-flag registers for move instructions, although the capability to write to these registers is not needed for the (AND/OR/TEST,=) instruction. Were FIG. 4 reduced to the more common two pipeline architecture by eliminating the third, simpler pipeline, the invention could still be incorporated into ALU A 123 or ALU B 125. But then this would pass the AND/OR/TEST command through the adder of the address generation stage (89 or 91) and the cache reading of the operand fetch stage (111 or 113), undermining much of the utility of the present invention. Having three, or more, pipelines makes the dedication of one pipeline in this way a more practical architecture. Even though it is less effective there, the preferred embodiment still includes the invention in one or both of the full ALUs in case a second or third (AND/OR/TEST,=) instruction is issued together with the first. It also improves the combination of (AND/OR/TEST,=) instructions with preceding dependent instructions as in the move/AND/OR/TEST unit, but for a larger number of dependent instructions.

The latches 119 and 121 are required in the embodiment of FIG. 4 to prevent the instructions of the third, simpler pipeline from racing ahead of those in the other pipelines. Such racing can lead to data hazards and other problems which occur when an instruction in one pipeline passes that in another pipeline upon which it is dependent. The use of these latches prevents the invention from fully exploiting its increase in speed. In another embodiment of the present invention, the microprocessor would make allowances for handling this possibility by having the capability for instructions being executed out of order. Within an architecture allowing out of order execution, latches corresponding to 85, 119, and 121 are absent. The (AND/OR/TEST,=) instruction can proceed immediately to conclusion without pausing at these intermediate latches. In this way, the increase in speed and power consumption due to the present invention would be even greater.

It is to be understood that while the invention has been described above in conjunction with preferred specific embodiments, the description and examples are intended to illustrate and not limit the scope of the invention, which is defined by the scope of the appended claims.

What is claimed is:

1. A method of executing a current instruction, wherein said current instruction comprises a plurality of operands, each of said operands identified by a label, the method comprising:

providing said current instruction to an instruction execution device, wherein said instruction execution device comprises a flags register having one or more flags;

testing whether said current instruction is an instruction selected from the group consisting of AND, OR, and TEST instructions;

determining whether the labels of said plurality of operands of the current instruction are the same; and assigning values to at least one of said one or more flags based on said operands when said current instruction is a member of said group and the labels of said plurality of operands of the current instruction are the same, without performing a logical operation of said plurality of operands.

2. The method according to claim 1, wherein said instruction execution device further comprises at least one general purpose register, and wherein each of said plurality of operands is a general purpose register.

3. The method according to claim 2, wherein the label of each of said plurality of operands comprises a series of bits, each bit having either value 1 or value 0, which are compared on an individual bit basis to determine whether they are the same.

4. The method according to claim 1, wherein the number of operands of the current instruction is two.

5. The method according to claim 1, wherein said instruction testing and said operand determining are performed at substantially the same time.

6. The method according to claim 1, further comprising assigning predetermined values to at least one of said one or more flags independent of said operands when said current instruction is a member of said group and the labels of said plurality of operands of the current instruction are the same, without performing a logical operation of said plurality of operands.

7. The method according to claim 6, wherein assigning said predetermined values to at least one flag comprises:

assigning a value 0 for the overflow flag and the carry flag.

8. An instruction execution device for processing a current instruction, wherein said current instruction comprises a plurality of operands, each of said operands identified by a label, and said instruction execution device comprising:

a flags register having one or more flags;

an AND/OR/TEST checker for receiving said current instruction, said AND/OR/TEST checker testing whether said current instruction is an instruction selected from the group consisting of AND, OR, and TEST instructions;

an operand comparator for receiving the labels of said plurality of operands of said current instruction, said operand comparator determining whether the labels of said plurality of operands of said current instruction are the same; and a result generator, coupling with said AND/OR/TEST checker and operand comparator, wherein said result generator operates to assign values to at least one of said one or more flags based on said operands when said current instruction is a member of said group and the labels of said plurality of operands of the current instruction are the same, without performing a logical operation of said plurality of operands.

9. The device of claim 8, wherein the instruction execution device further comprises at least one general purpose register, and wherein each of said plurality of operands is a general purpose register.

10. The device of claim 9, wherein the label of each of said plurality of operands comprises a series of bits, each bit having either value 1 or value 0, which are compared on an individual bit basis to determine whether they are the same.

11. The device of claim 8, wherein the result generator further operates to assign predetermined values to at least one of said one or more flags independent of said operands when said current instruction is a member of said group and the labels of said plurality of operands of the current instruction are the same, without performing a logical operation of said plurality of operands.

12. The device of claim 8, wherein the result generator operating to assign said predetermined values to at least one flag comprises:
assigning a value 0 for the overflow flag and the carry flag.

13. The device of claim 8, wherein the number of operands of the current instruction is two.

14. The device of claim 8, wherein the instruction execution device is a microprocessor.

15. The device of claim 14, wherein the microprocessor is comprised plurality of multi-staged pipelines.

16. The device of claim 15, wherein the pipeline containing said result generator contains an arithmetic logic unit having less capability than arithmetic logic units in the other pipelines.

17. The device of claim 15, wherein the number of pipelines is at least three, one of said at least three pipelines containing an arithmetic logic unit having less capability than those in the other pipelines, said result generator being in that pipeline which contains said lesser capability arithmetic logic unit.

18. A microprocessor for processing a current instruction, wherein said current instruction comprises a plurality of operands, each of said operands identified by a label, and said instruction execution device comprising:
a flags register having one or more flags;
an AND/OR/TEST checker for receiving said current instruction, said AND/OR/TEST checker testing whether said current instruction is an instruction selected from the group consisting of AND, OR, and TEST instructions;
an operand comparator for receiving the labels of said plurality of operands of said current instruction, said operand comparator determining whether the labels of said plurality of operands of said current instruction are the same; and
a result generator, coupling with said AND/OR/TEST checker and operand comparator, wherein said result generator operates to assign values to at least one of said one or more flags based on said operands when said current instruction is a member of said group and the labels of said plurality of operands of the current instruction are the same, without performing a logical operation of said plurality of operands.

19. The microprocessor of claim 18, wherein said microprocessor further comprises at least one general purpose register, and wherein each of said plurality of operands is a general purpose register.

20. The microprocessor of claim 19, wherein the label of each of said plurality of operands comprises a series of bits, each bit having either value 1 or value 0, which are compared on an individual bit basis to determine whether they are the same.

21. The microprocessor of claim 18, wherein the result generator further operates to assign predetermined values to at least one of said one or more flags independent of said operands when said current instruction is a member of said group and the labels of said plurality of operands of the current instruction are the same, without performing a logical operation of said plurality of operands.

22. The microprocessor of claim 18, wherein the result generator operating to assign said predetermined values to at least one flag comprises:
assigning a value 0 for the overflow flag and the carry flag.

23. The microprocessor of claim 18, wherein the number of operands of the current instruction is two.

24. The microprocessor of claim 18, additionally comprising a plurality of multi-staged pipelines.

25. The microprocessor of claim 24, wherein the pipeline containing said result generator contains an arithmetic logic unit having less capability than arithmetic logic units in the other pipelines.

26. The microprocessor of claim 24, wherein the number of pipelines is at least three, one of said at least three pipelines containing an arithmetic logic unit having less capability than those in the other pipelines, said result generator being in that pipeline which contains said lesser capability arithmetic logic unit.

27. A method of executing a pair of current instructions from a sequence of instructions, said pair of current instructions comprising a first current instruction and a subsequent second current instruction, wherein said second current instruction comprises a plurality of operands, each of said operands identified by a label, one or more of said plurality of operands of said second current instruction dependent on the result of said first current instruction, the method comprising:
providing said pair of current instructions to an instruction execution device, wherein said instruction execution device comprises a flags register having one or more flags;
testing whether said second current instruction is an instruction selected from the group consisting of AND, OR, and TEST instructions;
determining whether the labels of said plurality of operands of said second current instruction are the same; and
assigning values to at least one of said one or more flags based on said plurality of operands of the second current instruction dependent on the result of said first current instruction when said second current instruction is a member of said group and the labels of said plurality of operands of said second current instruction are the same, without performing a logical operation of said plurality of operands of said second current instruction.

28. The method according to claim 27, wherein the number of operands of the second current instruction is two.

29. The method according to claim 27, wherein said instruction testing and said operand determining are performed at substantially the same time.

30. An instruction execution device for processing a pair of current instructions from a sequence of instructions, said plurality of current instructions comprising a first current instruction and a subsequent second current instruction, wherein said second current instruction comprises a plurality of operands, each of said operands identified by a label, one or more of said plurality of operands of said second current instruction dependent on the result of said first current instruction, and said instruction execution device comprising:
a flags register having one or more flags;
an AND/OR/TEST checker for receiving said current instructions, said AND/OR/TEST checker testing whether said second current instruction is an instruction selected from the group consisting of AND, OR, and TEST instructions;

an operand comparator for receiving the labels of said plurality of operands of said second current instruction, said operand comparator determining whether the labels of said plurality of operands of said second current instruction are the same; and a result generator, coupling with said AND/OR/TEST checker and operand comparator, wherein said result generator operates to assign values to at least one of said one or more flags based on said plurality of operands of the second current instruction dependent on the result of said first current instruction when said second current instruction is a member of said group and the labels of said plurality of operands of the second current instruction are the same, without performing a logical operation of said plurality of operands.

31. The device of claim 30, wherein the number of operands of the second current instruction is two.

32. The device of claim 30, wherein the instruction execution device is a microprocessor.

* * * * *